(12) United States Patent
Nagai et al.

(10) Patent No.: US 11,499,824 B2
(45) Date of Patent: Nov. 15, 2022

(54) DISTANCE MEASURING CAMERA

(71) Applicant: MITSUMI ELECTRIC CO., LTD., Tokyo (JP)

(72) Inventors: Fumiya Nagai, Tokyo (JP); Satoru Suto, Tokyo (JP); Satoshi Ajiki, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 227 days.

(21) Appl. No.: 16/954,992

(22) PCT Filed: Dec. 3, 2018

(86) PCT No.: PCT/JP2018/044445
§ 371 (c)(1),
(2) Date: Jun. 17, 2020

(87) PCT Pub. No.: WO2019/124040
PCT Pub. Date: Jun. 27, 2019

(65) Prior Publication Data
US 2020/0309520 A1    Oct. 1, 2020

(30) Foreign Application Priority Data
Dec. 18, 2017 (JP) .............................. JP2017-241896

(51) Int. Cl.
*G01C 3/08* (2006.01)
*G06T 7/571* (2017.01)
*H04N 5/225* (2006.01)

(52) U.S. Cl.
CPC ................ *G01C 3/08* (2013.01); *G06T 7/571* (2017.01); *H04N 5/2258* (2013.01)

(58) Field of Classification Search
CPC . G01C 3/08; G01C 3/14; G02B 13/00; G03B 13/20; G03B 17/17; G03B 19/22;
(Continued)

(56) References Cited

U.S. PATENT DOCUMENTS

2016/0379066 A1  12/2016  Reiche et al.
2018/0077404 A1*  3/2018  Bechtel ................ H04N 13/239

FOREIGN PATENT DOCUMENTS

CN    110998228 A         4/2020
JP    H03200007 A    *    9/1991
(Continued)

OTHER PUBLICATIONS

Machine translation of JPH 03200007 A (Year: 1991).*
(Continued)

*Primary Examiner* — Christopher S Kelley
*Assistant Examiner* — Ana Picon-Feliciano
(74) *Attorney, Agent, or Firm* — McCoy Russell LLP

(57) ABSTRACT

A distance measurement camera 1 contains a first optical system OS1 for collecting light from a subject 100 to form a first subject image, a second optical system OS2 for collecting the light from the subject 100 to form a second subject image, an imaging part S for imaging the first subject image formed by the first optical system OS1 and the second subject image formed by the second optical system OS2, and a distance calculating unit 4 for calculating the distance to the subject 100 based on the first subject image and the second subject image imaged by the imaging part S. The distance calculating part 4 calculates the distance to the subject 100 based on an image magnification ratio between a magnification of the first subject image and a magnification of the second subject image.

10 Claims, 6 Drawing Sheets

(58) Field of Classification Search
CPC ...... G03B 35/08; G06T 7/571; H04N 5/2254; H04N 5/2258; H04N 5/232123; H04N 5/247
USPC .................................. 356/4.03; 348/47, 135
See application file for complete search history.

(56) References Cited

FOREIGN PATENT DOCUMENTS

| | | | |
|---|---|---|---|
| JP | H03200007 A | | 9/1991 |
| JP | 2001141422 A | * | 5/2001 |
| JP | 2001141422 A | | 5/2001 |
| JP | 2013190394 A | | 9/2013 |
| JP | 2017096777 A | | 6/2017 |
| RU | 2340872 C1 | | 12/2008 |

OTHER PUBLICATIONS

Machine translation of JP 2001141422 A (Year: 2001).*
ISA Japan Patent Office, International Search Report Issued in Application No. PCT/JP2018/044445, dated Feb. 26, 2019, WIPO, 2 pages.
European Patent Office, Extended European Search Report Issued in Application No. 18891982.3, dated Jul. 26, 2021, Germany, 7 pages.

* cited by examiner

DISTANCE MEASURING CAMERA

CROSS-REFERENCE TO RELATED APPLICATIONS

The present application is a U.S. National Phase of International Patent Application Serial No. PCT/JP2018/044445 entitled "DISTANCE MEASURING CAMERA," filed on Dec. 3, 2018. International Patent Application Serial No. PCT/JP2018/044445 claims priority to Japanese Patent Application No. 2017-241896 filed on Dec. 18, 2017. The entire contents of each of the above-referenced applications are hereby incorporated by reference for all purposes.

TECHNICAL FIELD

The present invention generally relates to distance measuring cameras for measuring a distance to a subject, in particular to a distance measuring camera for measuring a distance to a subject based on an image magnification ratio between at least two subject images respectively formed by at least two optical systems whose changes of magnitudes of the subject images according to the distance to the subject are different from each other.

BACKGROUND ART

In recent years, there is proposed a distance measuring camera for measuring a distance to a subject by imaging the subject. As such a distance measuring camera, there is known a stereo camera type distance measuring camera including two or more pairs of an optical system for collecting light from a subject to form a subject image and an image sensor for converting the subject image formed by the optical system to an image signal. Further, there is also known a pattern projection type distance measuring camera including a projector for projecting constant pattern light (such as grid pattern light) onto a subject and an imaging system for imaging the subject onto which the constant pattern light is being projected (for example, see patent document 1).

In the stereo camera type distance measuring camera, the two or more pairs of the optical system and the image sensor are used to obtain a plurality of images having different disparities and the distance to the subject is calculated based on the disparities among the plurality of obtained images. In order to accurately calculate the distance to the subject based on the disparities among the plurality of images, it is necessary to obtain a large disparity. Thus, it is required to arrange the two or more optical systems with being significantly far apart from each other in one distance measuring camera. This results in increase in a size of the distance measuring camera. Further, in the stereo camera type distance measuring camera, if the subject is located at a position close to the distance measuring camera, there is a case of obtaining an image in which any feature point of the subject for obtaining the disparity is shown and another image in which the same feature point of the subject for obtaining the disparity is not shown due to a relationship between a field of view of the obtained images. In order to avoid this situation, it is necessary to arrange the two or more optical systems with being close to each other. However, when the two or more optical systems are arranged so as to be close to each other, there is a problem that the disparity between the obtained images becomes small and thus it becomes difficult to accurately calculate the distance to the subject.

In the pattern projection type distance measuring camera, the constant pattern light is projected onto the subject and distortions of the constant pattern light projected onto the subject is analyzed to measure the distance to the subject. Thus, the pattern projection type distance measuring camera needs the projector for projecting the constant pattern light onto the subject. This makes a configuration of the distance measuring camera larger.

RELATED ART DOCUMENT

Patent Document

[Patent Document 1] JP 2013-190394A

SUMMARY OF THE INVENTION

Problems to be Solved by the Invention

The present invention has been made in view of the problems of the conventional arts mentioned above. Accordingly, it is an object of the present invention to provide a distance measuring camera which can calculate a distance to a subject without using disparities among a plurality of images and without projecting constant pattern light onto the subject.

Means for Solving the Problems

The above object is achieved by the present inventions defined in the following (1) to (8).
(1) A distance measurement camera, comprising:
a first optical system for collecting light from a subject to form a first subject image;
a second optical system for collecting the light from the subject to form a second subject image;
an imaging part for imaging the first subject image formed by the first optical system and the second subject image formed by the second optical system; and
a distance calculating part for calculating a distance to the subject based on the first subject image and the second subject image imaged by the imaging part,
wherein the distance calculating part calculates the distance to the subject based on an image magnification ratio between a magnification of the first subject image and a magnification of the second subject image.
(2) The distance measuring camera according to the above (1), wherein the first optical system and the second optical system are configured so that a focal length of the first optical system and a focal length of the second optical system are different from each other, and thereby a change of the magnification of the first subject image according to the distance to the subject is different from a change of the magnification of the second subject image according to the distance to the subject.
(3) The distance measuring camera according to the above (1) or (2), wherein the first optical system and the second optical system are configured so that a distance from an exit pupil of the first optical system to an image formation position of the first subject image formed by the first optical system when the subject is located at an infinity point is different from a distance from an exit pupil of the second optical system to an image formation position of the second subject image formed by the second optical system when the subject is located at the infinity point, and thereby a change of the magnification of the first subject image according to the distance to the subject is different from a change of the magnification of the second subject image according to the distance to the subject.

(4) The distance measuring camera according to any one of the above (1) to (3), wherein a difference in a depth direction exists between a front principal point of the first optical system and a front principal point of the second optical system, and thereby a change of the magnification of the first subject image according to the distance to the subject is different from a change of the magnification of the second subject image according to the distance to the subject.

(5) The distance measuring camera according to any one of the above (1) to (4), further comprising an association information storage part storing association information for associating the image magnification ratio between the magnification of the first subject image and the magnification of the second subject image with the distance to the subject, wherein the distance calculating part calculates the distance to the subject based on the image magnification ratio between the magnification of the first subject image and the magnification of the second subject image and the association information in the association information storage part.

(6) The distance measuring camera according to any one of the above (1) to (5), wherein the distance calculating part calculates a ratio between a size of the first subject image and a size of the second subject image as the image magnification ratio between the magnification of the first subject image and the magnification of the second subject image.

(7) The distance measuring camera according to any one of the above (1) to (6), wherein the imaging part contains a first image sensor for imaging the first subject image and a second image sensor for imaging the second subject image.

(8) The distance measuring camera according to any one of the above (1) to (6), wherein the imaging part is a single image sensor for imaging both of the first subject image and the second subject image.

Effect of the Invention

The distance measuring camera of the present invention uses the two optical systems configured so that the changes of the magnifications of the subject images according to the distance to the subject are different from each other and can measure the distance to the subject based on the image magnification ratio (the ratio of the magnifications) between the two subject images respectively formed by the two optical systems. Thus, in the distance measuring camera of the present invention, it is not necessary to ensure a large disparity unlike the conventional stereo camera type distance measuring camera using disparities among a plurality of images. Therefore, even if the two optical systems are arranged so as to be close to each other, it is possible to accurately calculate the distance to the subject. As a result, it is possible to reduce a size of the distance measuring camera compared with the conventional stereo camera type distance measuring camera. Further, since the distance measuring camera of the present invention does not use any disparity to calculate the distance to the subject, it is possible to accurately calculate the distance to the subject even if the subject is located at a position closed to the distance measuring camera. Further, according to the present invention, it becomes unnecessary to design the distance measuring camera with considering the disparities. Thus, it is possible to enhance the flexibility of design for the distance measuring camera.

Further, in the distance measuring camera of the present invention, it is not necessary to use a special light source such as a projector for projecting constant pattern light onto the subject unlike the conventional pattern projection type distance measuring camera. Thus, it is possible to simplify a system configuration of the distance measuring camera. As a result, it is possible to realize downsizing, weight-saving, power-saving and cost-reducing of the distance measuring camera compared with the conventional pattern projection type distance measuring camera.

DETAILED DESCRIPTION

First, description will be given to a principle for calculating a distance to a subject, which is used in a distance measuring camera of the present invention.

A magnification "$m_{OD}$" of a subject image formed by an optical system can be calculated from a distance (subject distance) "a" from a front principal point (front principal plane) of the optical system to the subject, a distance "$b_{OD}$" from a rear principal point (rear principal plane) of the optical system to an image formation position of the subject image and the focal length "f" of the optical system according to the following equation (1) derived from the lens equation.

[Equation 1]

$$m_{OD} = \frac{b_{OD}}{a} = \frac{f}{a-f} \quad (1)$$

Further, a size "$Y_{OD}$" of the subject image can be calculated from the magnification "$m_{OD}$" of the subject image and an actual size "sz" of the subject according to the following equation (2).

[Equation 2]

$$Y_{OD} = sz \cdot m_{OD} = \frac{sz \cdot f}{a-f} \quad (2)$$

When an imaging surface of an image sensor (imaging element) is located at an image formation position of the subject image, that is, when the subject is in the best focus, the size "$Y_{OD}$" of the subject image can be calculated by the above equation (2). When the optical system has an autofocus function and always images the subject with its best focus, the size "$Y_{OD}$" of the subject image can be calculated by using the above equation (2).

However, when the optical system is a fixed focus system having no autofocus function and the imaging surface of the image sensor (imaging element) is not located at the image formation position of the subject image, that is, when defocus is present, it is required to consider a defocus amount, that is, a difference (shift amount) between the image formation position of the subject image and a position of the imaging surface of the image sensor in a depth direction (optical axis direction) in order to obtain the size "$Y_{FD}$" of the subject image formed on the imaging surface of the image sensor.

Figure 1:
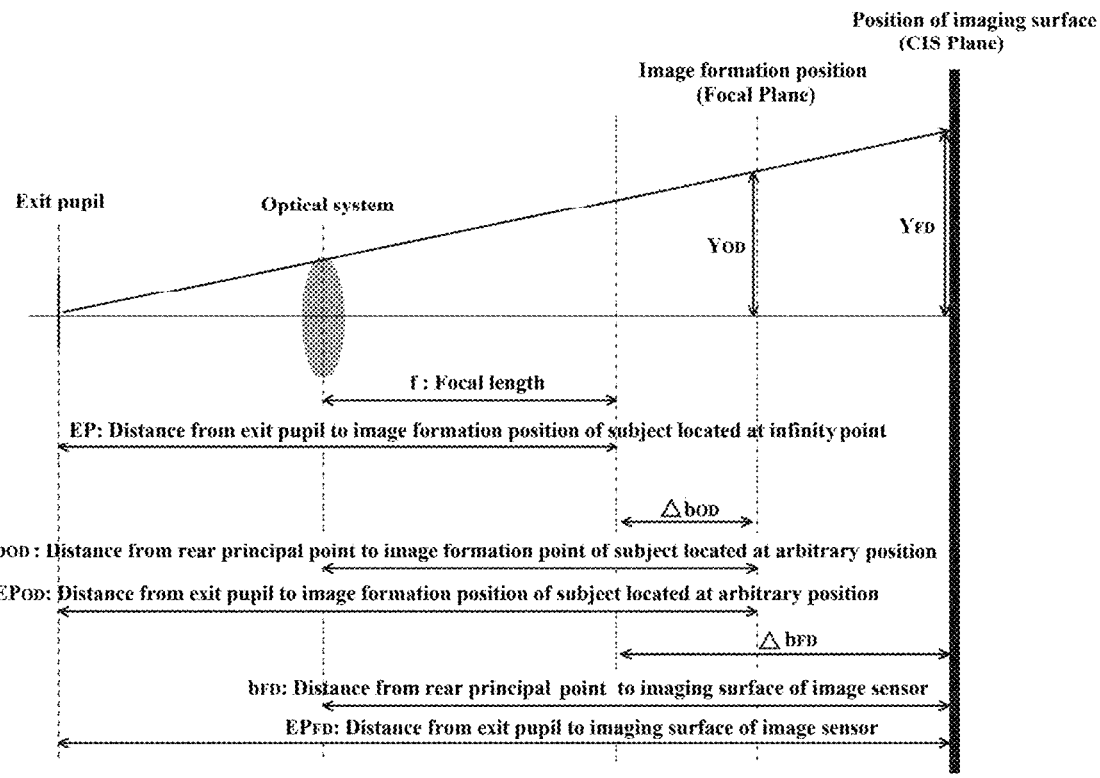
FIG. 1 is a view for explaining a distance measuring principle of a distance measuring camera of the present invention.

As shown in FIG. 1, a distance from an exit pupil of the optical system to an image formation position of the subject image when the subject is located at an infinity point is defined as "EP", a distance from the exit pupil of the optical system to an image formation point of the subject image when the subject is located at an arbitrary distance "a" is defined as "$EP_{OD}$", and a distance from the exit pupil of the optical system to the imaging surface of the image sensor (focus adjustment distance: Focus Distance) is defined as "$EP_{FD}$". Further, a distance from the rear principal point of the optical system to the image formation position of the subject image when the subject is located at the arbitrary distance "a" is defined as "$b_{OD}$" and a distance from the rear principal point of the optical system to the imaging plane of the image sensor is defined as "$b_{FD}$".

The distance "$b_{OD}$" from the rear principal point of the optical system to the image formation position of the subject image when the subject is located at the arbitrary distance "a" can be calculated according to the following formula (3) derived from the lens equation.

[Equation 3]

$$b_{OD} = \frac{1}{1/f - 1/a} = \frac{a \cdot f}{a-f} \quad (3)$$

Therefore, a difference "$\Delta b_{OD}$" between the focal length "f" and the distance "$b_{OD}$" can be calculated according to the following equation (4).

[Equation 4]

$$\Delta b_{OD} = b_{OD} - f = \frac{a \cdot f}{a-f} - f = \frac{f^2}{a-f} \quad (4)$$

Further, a distance "$b_{FD}$" from the rear principal point of the optical system to the imaging surface of the image sensor can be calculated from a distance "$a_{FD}$" from the front principal point of the optical system to the subject when the subject image is in the best focus on the imaging surface of the image sensor according to the following formula (5) derived from the lens equation.

[Equation 5]

$$b_{FD} = \frac{1}{1/f - 1/a_{FD}} = \frac{a_{FD} \cdot f}{a_{FD} - f} \quad (5)$$

Therefore, a difference "$\Delta b_{FD}$" between the focal length "f" and the distance "$b_{FD}$" can be calculated according to the following equation (6).

[Equation 6]

$$\Delta b_{FD} = b_{FD} - f = \frac{a_{FD} \cdot f}{a_{FD} - f} - f = \frac{f^2}{a_{FD} - f} \quad (6)$$

Further, as is clear from FIG. 1, a right-angled triangle having one vertex at the intersection of the optical axis and the exit pupil of the optical system and one side which is the size "$Y_{OD}$" of the subject image at the image formation position of the subject image when the subject is located at the arbitrary distance "a" is similar to a right-angled triangle having one vertex at the intersection of the optical axis and the exit pupil of the optical system and one side which is the size "$Y_{FD}$" of the subject image on the imaging surface of the image sensor. Therefore, "$EP_{OD}$":"$EP_{FD}$"="$Y_{OD}$":"$Y_{FD}$" is satisfied from the similarity relationship and the size "$Y_{FD}$" of the subject image on the imaging surface of the image sensor can be calculated according to the following equation (7).

[Equation 7]

$$EP_{OD}:EP_{FD} = Y_{OD}:Y_{FD} \quad (7)$$
$$EP + \Delta b_{OD} : EP + \Delta b_{FD} = Y_{OD}:Y_{FD}$$
$$Y_{FD} = \frac{EP + \Delta b_{FD}}{EP + \Delta b_{OD}} \cdot Y_{OD} =$$
$$\left(\frac{f^2 - EP \cdot f + EP \cdot a_{FD}}{a_{FD} - f} \bigg/ \frac{f^2 - EP \cdot f + EP \cdot a}{a-f}\right) \cdot \frac{sz \cdot f}{a-f} = \frac{sz \cdot f \cdot \left(\frac{f^2 - EP \cdot f + EP \cdot a_{FD}}{}\right)}{(a_{FD} - f) \cdot \left(\frac{f^2 - EP \cdot f + EP \cdot a}{}\right)}$$

As is clear from the above equation (7), the size "$Y_{FD}$" of the subject image on the imaging surface of the image sensor can be expressed as a function of the actual size "sz" of the subject, the focal length "f" of the optical system, the distance "EP" from the exit pupil of the optical system to the image formation position of the subject image when the subject is located at the infinity point, the distance (subject distance) "a" from the optical system to the subject and the distance "$a_{FD}$" from the optical system to the subject when the subject image is in the best focus on the imaging surface of the image sensor.

Figure 2:
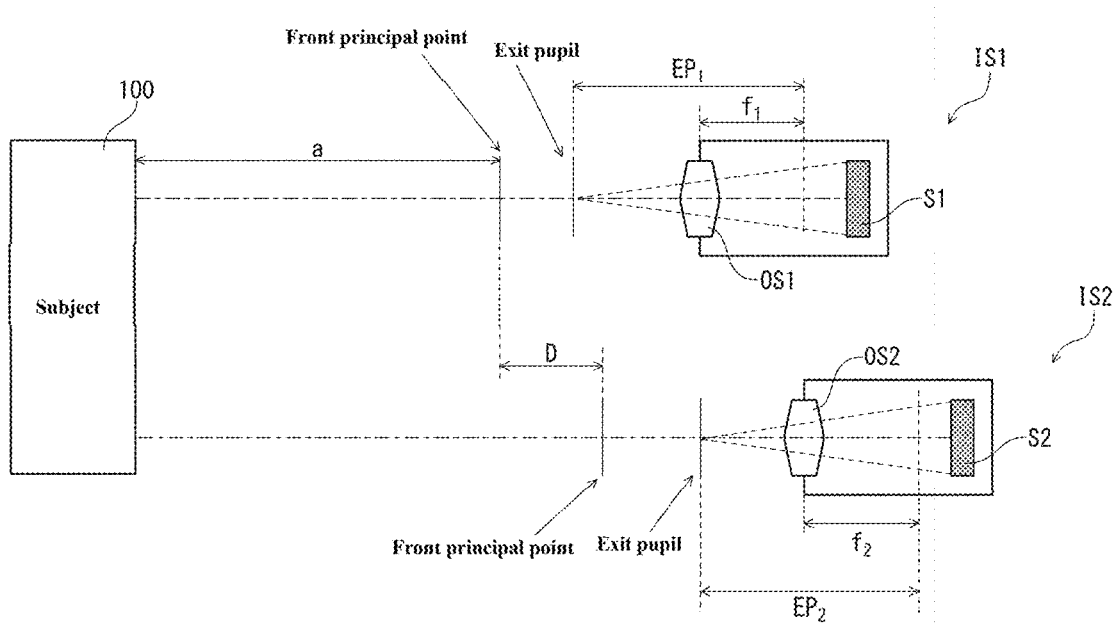
FIG. 2 is another view for explaining the distance measuring principle of the distance measuring camera of the present invention.

Next, as shown in FIG. 2, it is assumed that one subject 100 is imaged by using two imaging systems IS1, IS2. The first imaging system IS1 includes a first optical system OS1 for collecting light from the subject 100 to form a first subject image and a first image sensor S1 for imaging the first subject image formed by the first optical system OS1. The second imaging system IS2 includes a second optical system OS2 for collecting the light from the subject 100 to form a second subject image and a second image sensor S2 for imaging the second subject image formed by the second optical system OS2. Further, as is clear from FIG. 2, although an optical axis of the first optical system OS1 for the first image sensor S1 and an optical axis of the second optical system OS2 for the image sensor S2 are parallel to each other, the optical axis of the first optical system OS1 and the optical axis of the second optical system OS2 do not coincide with each other.

The first optical system OS1 and the second optical system OS2 are fixed-focus optical system each having different focal lengths "$f_1$" and "$f_2$". When the first imaging system IS1 is configured, a position (lens position) of the first optical system OS1, that is, a separation distance between the first optical system OS1 and the first image sensor S1 is adjusted so that the first subject image of the subject 100 which is located at an arbitrary distance "$a_{FD1}$" is formed on an imaging surface of the first image sensor S1, that is, the subject 100 which is located at the arbitrary distance "$a_{FD1}$" is in the best focus. Similarly, when the second imaging system IS2 is configured, a position (lens position) of the second optical system OS2, that is, a separation distance between the second optical system OS2 and the second image sensor S2 is adjusted so that the second subject image of the subject 100 which is located at an arbitrary distance "$a_{FD2}$" is formed on an imaging surface of the second image sensor S2, that is, the subject 100 which is located at the arbitrary distance "$a_{FD2}$" is in the best focus.

Further, a distance from an exit pupil of the first optical system OS1 to an image formation position of the first subject image when the subject 100 is located at an infinity position is "$EP_1$" and a distance from an exit pupil of the second optical system OS2 to an image formation position of the second subject image when the subject 100 is located at the infinity position is "$EP_2$".

The first optical system OS1 and the second optical system OS2 are configured and arranged so that a distance "D" in the depth direction (optical axis direction) exists between a front principal point (front principal plane) of the first optical system OS1 and a front principal point (front principal plane) of the second optical system OS2. Namely, when a distance (subject distance) from the front principal point of the first optical system OS1 to the subject is defined as "a", a distance from the front principal point of the second optical system OS2 to the subject is "a+D".

By using the similarity relationship described with referring to FIG. 1, a magnification "$m_1$" of the first subject image formed on the imaging surface of the first image sensor S1 by the first optical system OS1 can be calculated according to the following equation (8).

[Equation 8]

$$m_1 = \frac{EP_{FD1}}{EP_{OD1}} \cdot m_{OD1} = \frac{EP_1 + \Delta b_{FD1}}{EP_1 + \Delta b_{OD1}} \cdot m_{OD1} \quad (8)$$

Here, "$EP_{OD1}$" is a distance from the exit pupil of the first optical system OS1 to an image formation position of the first subject image when the subject 100 is located at the distance "a" and "$EP_{FD1}$" is a distance from the exit pupil of the first optical system OS1 to the imaging surface of the first image sensor S1. A positional relationship between the distance "$EP_{OD1}$" and the distance "$EP_{FD1}$" is determined at the time of configuring the first imaging system IS1 by adjusting the position (lens position) of the first optical system OS1 so that the subject 100 located at the distance "$a_{FD1}$" is in the best focus. Further, "$\Delta b_{OD1}$" is a difference between the focal length "$f_1$" and a distance "$b_{OD1}$" from a rear principal point of the first optical system OS1 to the image formation position of the first subject image when the subject 100 is located at the distance "a". "$\Delta b_{FD1}$" is a difference between the focal length "$f_1$" and a distance "$b_{FD1}$" from the rear principal point of the first optical system OS1 to the imaging surface of the first image sensor S1. "$m_{OD1}$" is a magnification of the first subject image at the image formation position of the first subject image when the subject 100 is located at the distance "a".

Since the above equations (1), (4) and (6) can be applied to the image formation by the first optical system OS1, the above equation (8) can be expressed by the following equation (9).

[Equation 9]

$$m_1 = \left( \frac{\frac{f_1^2 - EP_1 \cdot f_1 +}{EP_1 \cdot a_{FD1}}}{a_{FD1} - f_1} \bigg/ \frac{f_1 + EP_1 \cdot a}{a - f_1} \right) \cdot \frac{f_1}{a - f_1} = \frac{f_1 \cdot \left( \frac{f_1^2 - EP_1 \cdot f_1 +}{EP_1 \cdot a_{FD1}} \right)}{(a_{FD1} - f_1) \cdot \left( \frac{f_1^2 - EP_1 \cdot}{f_1 + EP_1 \cdot a} \right)} \quad (9)$$

Here, "$a_{FD1}$" is the distance from the front principal point of the first optical system OS1 to the subject 100 when the first subject image is in the best focus on the imaging surface of the first image sensor S1.

Similarly, a "magnification $m_2$" of the second subject image formed on the imaging surface of the second image sensor S2 by the second optical system OS2 can be calculated according to the following equation (10).

[Equation 10]

$$m_2 = \frac{EP_{FD2}}{EP_{OD2}} \cdot m_{OD2} = \frac{EP_2 + \Delta b_{FD2}}{EP_2 + \Delta b_{OD2}} \cdot m_{OD2} = \left( \frac{\frac{f_2^2 - EP_2 \cdot f_2 +}{EP_2 \cdot a_{FD2}}}{a_{FD2} - f_2} \bigg/ \frac{f_2 + EP_2 \cdot (a+D)}{(a+D) - f_2} \right) \cdot \frac{f_2}{(a+D) - f_2} = \frac{f_2 \cdot (f_2^2 - EP_2 \cdot f_2 + EP_2 \cdot a_{FD2})}{(a_{FD2} - f_2) \cdot (f_2^2 - EP_2 \cdot f_2 + EP_2 \cdot (a+D))} \quad (10)$$

Here, "$EP_{OD2}$" is a distance from the exit pupil of the second optical system OS2 to the image formation position of the second subject image when the subject 100 is located at the distance "a+D" and "$EP_{FD2}$" is a distance from the exit pupil of the second optical system OS2 to the imaging surface of the second image sensor S2. A positional relationship between the distance "$EP_{OD2}$" and the distance "$EP_{FD2}$" is determined at the time of configuring the second imaging system IS2 by adjusting the position (lens position) of the second optical system OS2 so that the subject 100 located at the arbitrary distance "$a_{FD2}$" is in the best focus. In addition, "$\Delta b_{OD2}$" is a difference between the focal length "$f_2$" and a distance "$b_{OD2}$" from the rear principal point of the second optical system OS2 to the image formation position of the second subject image when the subject 100 is located at the distance "a+D". "$b_{FD2}$" is a difference between the focal length "$f_2$" and a distance "$b_{FD2}$" from the rear principal point of the second optical system OS2 to the imaging surface of the second image sensor S2. "$m_{OD2}$" is a magnification of the second subject image at the image formation position of the second subject image when the subject 100 is located at the distance "a+D". "$a_{FD2}$" is the distance from the front principal point of the second optical system OS2 to the subject 100 when the second subject image is in the best focus on the imaging surface of the second image sensor S2.

Therefore, an image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 can be calculated according to the following equation (11).

[Equation 11]

$$MR = \frac{m_2}{m_1} = \frac{f_2}{f_1} \cdot \frac{a_{FD1} - f_1}{a_{FD2} - f_2} \cdot \frac{EP_2 \cdot a_{FD2}}{f_1^2 - EP_1 \cdot} \cdot \frac{f_1 + EP_1 \cdot a}{f_2^2 - EP_2 \cdot} = \\ \frac{f_2^2 - EP_2 \cdot f_2 +}{f_1 + EP_1 \cdot a_{FD1}} \quad \frac{f_1^2 - EP_1 \cdot}{f_2 + EP_2 \cdot (a+D)}$$

$$K \cdot \frac{f_1^2 - EP_1 \cdot}{f_1 + EP_1 \cdot a} \\ \frac{f_2^2 - EP_2 \cdot}{f_2 + EP_2 \cdot (a+D)} \qquad (11)$$

Here, "K" is a coefficient and represented by the following equation (12) constituted of the fixed values "$f_1$", "$f_2$", "$EP_1$", "$EP_2$", "$a_{FD1}$" and "$a_{FD2}$" determined by the configurations of the first imaging system IS1 and the second imaging system IS2.

[Equation 12]

$$K = \frac{f_2}{f_1} \cdot \frac{a_{FD1} - f_1}{a_{FD2} - f_2} \cdot \frac{f_2^2 - EP_2 \cdot f_2 + EP_2 \cdot a_{FD2}}{f_1^2 - EP_1 \cdot} \qquad (12)$$
$$f_1 + EP_1 \cdot a_{FD1}$$

As is clear from the above equation (11), it would be understood that the image magnification ratio "MR" between the magnification "$m_1$" of the first subject image formed on the imaging surface of the first image sensor S1 by the first optical system OS1 and the magnification "m2" of the second subject image formed on the imaging surface of the second image sensor S2 by the second optical system OS2 changes according to the distance "a" from the subject 100 to the front principal point of the first optical system OS1.

By solving the above equation (11) for the distance "a", a general equation (13) for the distance "a" to the subject 100 can be obtained.

[Equation 13]

$$a = \frac{K \cdot (f_1^2 - EP_1 \cdot f_1) - MR \cdot (f_2^2 - EP_2 \cdot f_2 + EP_2 \cdot D)}{MR \cdot EP_2 - K \cdot EP_1} \qquad (13)$$

In the above equation (13), "$f_1$", "$f_2$", "$EP_1$", "$EP_2$", "D", and "K" are the fixed values determined by the configurations of the first imaging system IS1 and the second imaging system IS2. Thus, if the image magnification ratio "MR" can be obtained, it is possible to calculate the distance "a" from the subject 100 to the front principal point of the first optical system OS1.

Figure 3:
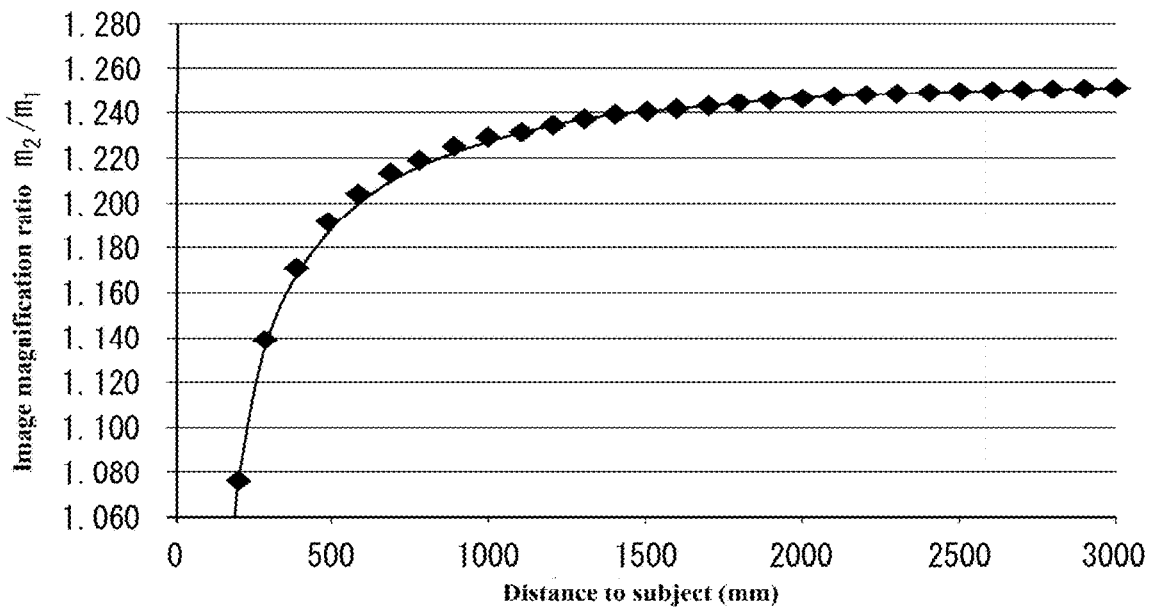
FIG. 3 is a graph for explaining that an image magnification ratio between a magnification of a first subject image formed by a first optical system shown in FIG. 2 and a magnification of a second subject image formed by a second optical system shown in FIG. 2 changes according to a distance to a subject.

FIG. 3 shows an exemplary relationship between the image magnification ratio "MR" of the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 and the distance "a" to the subject 100, which is calculated based on the above equation (13). As is clear from FIG. 3, one-to-one relationship is established between the value of the image magnification ratio "MR" and the distance "a" to the subject 100. On the other hand, the image magnification ratio "MR" can be calculated according to the following equation (14).

[Equation 14]

$$MR = \frac{m_2}{m_1} = \frac{Y_{FD2}/sz}{Y_{FD1}/sz} = \frac{Y_{FD2}}{Y_{FD1}} \qquad (14)$$

Here, "sz" is an actual size (height or width) of the subject 100, "$Y_{FD1}$" is a size (image height or image width) of the first subject image formed on the imaging surface of the first image sensor S1 by the first optical system OS1 and "$Y_{FD2}$" is a size (image height or image width) of the second subject image formed on the imaging surface of the second image sensor S2 by the second optical system OS2.

The size "$Y_{FD1}$" of the first subject image and the size "$Y_{FD2}$" of the second subject image can be calculated from an image signal of the first subject image and an image signal of the second subject image which are respectively obtained by imaging the first subject image with the first image sensor S1 and imaging the second subject image with the second image sensor S2. Therefore, by actually measuring the size "$Y_{FD1}$" of the first subject image and the size "$Y_{FD2}$" of the second subject image from the image signal of the first subject image and the image signal of the second subject image obtained by actually imaging the subject 100 using the first imaging system IS1 and the second imaging system IS2, it is possible to obtain the image magnification ratio "MR" between the magnification "$m_1$" of the first subject image and the magnification "$m_2$" of the second subject image based on the measured size "$Y_{FD1}$" and the measured size "$Y_{FD2}$".

According to the above-described principle, the distance measuring camera of the present invention calculates the image magnification ratio "MR" between the magnification "$m_1$" of the first subject image and the magnification "$m_2$" of the second subject image based on the actually measured size "$Y_{FD1}$" of the first subject image and the actually measured size "$Y_{FD2}$" of the second subject image to calculate the distance "a" from the front principal point of the first optical system OS1 to the subject 100.

In this regard, as is clear from the above equation (11), when the focal length "$f_1$" of the first optical system OS1 is equal to the focal length "$f_2$" of the second optical system OS2 ("$f_1$"="$f_2$"), the distance "$EP_1$" from the exit pupil of the first optical system OS1 to the image formation position of the first subject image when the subject 100 is located at the infinity point is equal to the distance "$EP_2$" from the exit pupil of the second optical system OS2 to the image formation position of the second subject image when the subject 100 is located at infinity point ("$EP_1$"="$EP_2$") and the difference "D" in the depth direction (the optical axis direction) between the front principal point of the first optical system OS1 and the front principal point of the second optical system OS2 does not exist ("D"=0), the image magnification ratio "MR" is not established as the function of the distance "a" and the image magnification ratio "MR" becomes a constant value. In this case, the change of the magnification "$m_1$" of the first subject image according to the distance "a" to the subject 100 becomes the same as the change of the magnification "$m_2$" of the second subject image according to the distance "a" to the subject 100 and thus it becomes impossible to calculate the distance "a" from the first optical system OS1 to the subject based on the image magnification ratio "MR".

Further, as a special condition, even if the conditions of "$f_1$"≠"$f_2$", "$EP_1$"≠"$EP_2$" and "D"=0 are satisfied, in a case of "$f_1$"="$EP_1$" and "$f_2$"="$EP_2$", the image magnification ratio "MR" is not established as the function of the distance "a" and thus the image magnification ratio "MR" becomes a constant value. In such a special case, it is impossible to calculate the distance "a" from the first optical system OS1 to the subject based on the image magnification ratio "MR".

Therefore, in the distance measuring camera of the present invention, the first optical system OS1 and the second optical system OS2 are configured and arranged so that at least one of the following three conditions is satisfied, and thereby the change of the magnification "$m_1$" of the first subject image according to the distance "a" to the subject 100 is different from the change of the magnification "$m_2$" of the second subject image according to the distance "a" to the subject 100.

(1) (First condition) The focal length "$f_1$" of the first optical system OS1 and the focal length "$f_2$" of the second optical system OS2 are different from each other ("$f_1$"≠"$f_2$").
(2) (Second condition) The distance "$EP_1$" from the exit pupil of the first optical system OS1 to the image formation position of the first subject image when the subject 100 is located at the infinity point and the distance "$EP_2$" from the exit pupil of the second optical system OS2 to the image formation position of the second subject image when the subject 100 is located at the infinity point are different from each other ("$EP_1$"≠"EP2").
(3) (Third condition) The difference D in the depth direction (the optical axis direction) exists between the front principal point of the first optical system OS1 and the front principal point of the second optical system OS2 ("D"≠0).

In addition, even if at least one of the first to third conditions described above is satisfied, in the above-described special case ("$f_1$"≠"$f_2$", "$EP_1$"≠"$EP_2$", "D"=0, "$f_1$"="$EP_1$" and "$f_2$"="$EP_2$"), the image magnification ratio "MR" is not established as the function of the distance "a" and thus it is impossible to calculate the distance "a" from the first optical system OS1 to the subject based on the image magnification ratio "MR". Therefore, in order to calculate the distance "a" from the first optical system OS1 to the subject based on the image magnification ratio "MR", the distance measuring camera of the present invention is configured to satisfy a fourth condition that the image magnification ratio "MR" is established as the function of the distance "a".

Therefore, it is possible to calculate the distance "a" from the front principal point of the first optical system OS1 to the subject 100 by calculating the image magnification ratio "MR" from the size "$Y_{FD1}$" of the first subject image and the size "$Y_{FD2}$" of the second subject image which are respectively actually measured from the image signal of the first subject image and the image signal of the second subject image obtained by using the distance measuring cameras of the present invention.

Hereinafter, the distance measuring cameras of the present invention for calculating the distance "a" from the front principal point of the first optical system OS1 to the subject 100 using the above-described principle will be described in detail with reference to preferred embodiments shown in the accompanying drawings.

First Embodiment

Figure 4:
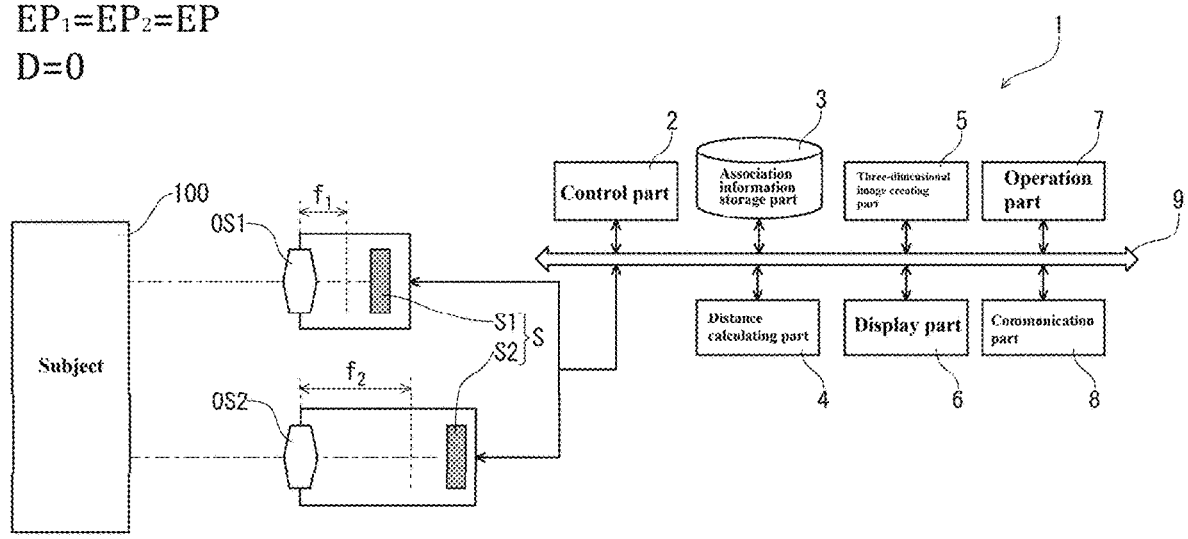
FIG. 4 is a block diagram schematically showing the distance measuring camera according to a first embodiment of the present invention.

First, a distance measuring camera according to a first embodiment of the present invention will be described with reference to FIG. 4. FIG. 4 is a block diagram schematically showing the distance measuring camera according to the first embodiment of the present invention.

A distance measuring camera 1 shown in FIG. 4 includes a control part 2 for performing control of the distance measuring camera 1, a first optical system OS1 for collecting light from a subject 100 to form a first subject image, a second optical system OS2 for collecting the light from the subject 100 to form a second subject image, an imaging part S for imaging the first subject image formed by the first optical system OS1 and the second subject image formed by the second optical system OS2, an association information storage part 3 storing association information for associating an image magnification ratio "MR" between a magnification "m1" of the first subject image and a magnification "m2" of the second subject image with a distance "a" to the subject 100, a distance calculating part 4 for calculating the distance "a" to the subject 100 based on the first subject image and the second subject image imaged by the imaging part S, a three-dimensional image creating part 5 for creating a three-dimensional image of the subject 100 based on the first subject image or the second subject image imaged by the imaging part S and the distance "a" to the subject 100 calculated by the distance calculating part 4, a display part 6 such as a liquid crystal panel for displaying arbitrary information, an operation part 7 for inputting an operation from a user, a communication part 8 for performing communication with external devices and a data bus 9 for transmitting and receiving data between the components of the distance measuring camera 1.

The distance measuring camera 1 according to the present embodiment is characterized in that the first optical system OS1 and the second optical system OS2 are configured so as to satisfy the first condition that the focal length "$f_1$" of the first optical system OS1 and the focal length "$f_2$" of the second optical system OS2 are different from each other ("$f_1$"≠"$f_2$") among the above-described three conditions required for calculating the distance "a" to the subject 100 based on the image magnification ratio "MR". On the other hand, in the present embodiment, the first optical system OS1 and the second optical system OS2 are configured and arranged so as not to satisfy the two other conditions ("$EP_1$"≠"$EP_2$" and "D"≠0) among the above-described three conditions. Further, the distance measuring camera 1 of the present embodiment is configured to satisfy the fourth condition that the image magnification ratio "MR" is established as the function of the distance "a".

Therefore, the above-mentioned general expression (13) for calculating the distance "a" to the subject 100 using the image magnification ratio "MR" is simplified by the conditions of "$EP_1$"="$EP_2$"="EP" and "D"=0 and thus can be expressed by the following equation (15).

[Equation 15]
$$a = \frac{K \cdot (f_1^2 - EP \cdot f_1) - MR \cdot (f_2^2 - EP \cdot f_2)}{EP \cdot (MR - K)} \quad (15)$$

Here, the coefficient "K" is expressed by the following equation (16).

[Equation 16]
$$K = \frac{f_2}{f_1} \cdot \frac{a_{FD1} - f_1}{a_{FD2} - f_2} \cdot \frac{f_2^2 - EP \cdot f_2 + EP \cdot a_{FD2}}{f_1^2 - EP \cdot f_1 + EP \cdot a_{FD1}} \quad (16)$$

The distance measuring camera 1 of the present embodiment calculates the image magnification ratio "MR" between the magnification "$m_1$" of the first subject image and the magnification "$m_2$" of the second subject image by imaging the subject 100 with the imaging part S and further calculates the distance "a" to the subject 100 by using the above equation (15).

Hereinafter, each component of the distance measuring camera 1 will be described in detail. The control part 2 transmits and receives various data and/or various instructions among the components through the data bus 9 to perform the control of the distance measuring camera 1. The control part 2 includes a processor for performing operational processes and a memory storing data, programs, modules and the like required for performing the control of the distance measuring camera 1. The processor of the control part 2 uses the data, the programs, the modules and the like stored in the memory to perform the control of the distance measuring camera 1. Further, the processor of the control part 2 can provide desired functions by using each component of the distance measuring camera 1. For example, the processor of the control part 2 can use the distance calculating part 4 to perform a process for calculating the distance "a" to the subject 100 based on the first subject image and the second subject image imaged by the imaging part S.

For example, the processor of the control part 2 is one or more operation parts such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes for manipulating signals or the like based on computer-readable instructions. Among other capabilities, the processor of the control part 2 is configured to fetch computer-readable instructions (such as data, programs and modules) stored in the memory of the control part 2 and perform control and signal manipulation.

The memory of the control part 2 is one or more removable or non-removable computer-readable media including volatile memories (such as RAMs, SRAMs and DRAMs), non-volatile memories (such as ROM, EPROMs, flash memories, hard disks, optical discs, CD-ROMs, digital versatile discs (DVDs), magnetic cassettes, magnetic tapes and magnetic disks) and combinations thereof.

The first optical system OS1 has a function of collecting the light from the subject 100 to form the first subject image on an imaging surface of a first image sensor S1 of the imaging part S. The second optical system OS2 has a function of collecting the light from the subject 100 to form the second subject image on an imaging surface of a second image sensor S2 of the imaging part S. Each of the first optical system OS1 and the second optical system OS2 is constituted of one or more lenses and one or more optical elements such as an aperture. Further, as shown in the drawing, although an optical axis of the first optical system OS1 and an optical axis of the second optical system OS2 are parallel to each other, the optical axis of the first optical system OS1 and the optical axis of the second optical system OS2 do not coincide with each other.

As described above, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"). Thereby, a change of the magnification "$m_1$" of the first subject image formed by the first optical system OS1 according to the distance "a" to the subject 100 is different from a change of the magnification "$m_2$" of the second subject image formed by the second optical system OS2 according to the distance "a" to the subject 100.

In this regard, the configurations and the arrangements of the first optical system OS1 the second optical system OS2 in the present embodiment may be any aspect as long as the above-mentioned first condition ("$f_1$"≠"$f_2$") is satisfied, and thereby the change of the magnification "$m_1$" of the first subject image with respect to the distance "a" to the subject 100 and the change of the magnification "$m_2$" of the second subject image with respect to the distance "a" to the subject 100 are different from each other.

The imaging part S has a function of imaging the first subject image formed by the first optical system OS1 and the second subject image formed by the second optical system OS2 to obtain an image signal of the first subject image and an image signal of the second subject image. In the present embodiment, the imaging part S includes the first image sensor S1 for imaging the first subject image to obtain the image signal of the first subject image and the second image sensor S2 for imaging the second subject image to obtain the image signal of the second subject image.

Although the first image sensor S1 and the first optical system OS1 are provided in one housing and the second image sensor S2 and the second optical system OS2 are provided in another housing in the illustrated embodiment, the present invention is not limited thereto. An aspect in which all of the first optical system OS1, the second optical system OS2, the first image sensor S1 and the second image sensor S2 are provided in one housing is also involved within the scope of the present disclosure.

The first image sensor S1 and the second image sensor S2 may be a color image sensor such as a CMOS image sensor or a CCD image sensor having a color filter such as an RGB primary color filter or a CMY complementary color filter arranged in any pattern such as a bayer arrangement or a monochrome image sensor without such a color filter.

The first subject image is formed on the imaging surface of the first image sensor S1 by the first optical system OS1 and the color or monochrome image signal of the first subject image is obtained by the first image sensor S1. The obtained image signal of the first subject image is transmitted to the control part 2 and the distance calculating part 4 through the data bus 9. In the same manner, the second subject image is formed on the imaging surface of the second image sensor S2 by the second optical system OS2 and the color or monochrome image signal of the second subject image is obtained by the second image sensor S2. The obtained image signal of the second subject image is transmitted to the control part 2 and the distance calculating part 4 through the data bus 9. The image signal of the first subject image and the image signal of the second subject image transmitted to the distance calculating part 4 are used for calculating the distance "a" to the subject 100. On the other hand, the image signal of the first subject image and the image signal of the second subject image transmitted to the control part 2 are used for image displaying due to the display part 6 and communication of the image signals due to the communication part 8.

The association information storage part 3 is an arbitrary non-volatility storage medium (such as a hard disk and a flash memory) for storing the association information for associating the image magnification ratio "MR" ($m_2/m_1$) between the magnification "$m_1$" of the first subject image and the magnification "$m_2$" of the second subject image with the distance "a" from the front principal point of the first optical system OS1 to the subject 100. The association information stored in the association information storage part 3 is information for calculating the distance "a" from the front principal point of the first optical system OS1 to the subject 100 from the image magnification ratio "MR" ($m_2/m_1$) between the magnification "$m_1$" of the first subject image and the magnification "$m_2$" of the second subject image.

Typically, the association information stored in the association information storage part 3 contains the above equation (15) (or the general equation (13)) for calculating the distance "a" to the subject 100 based on the image magnification ratio "MR" and the above-described fixed values used in these equations and determined by the configurations and the arrangements of the first optical system OS1 and the second optical system OS2 (for example, the fixed values "$f_1$", "$f_2$", "EP" and "K" for the above equation (15)). Alternatively, the association information stored in the association information storage part 3 may be a look-up table for uniquely associating the image magnification ratio "MR" with the distance "a" to the subject 100. By referring to such association information stored in the association information storage part 3, it becomes possible to calculate the distance "a" to the subject 100 based on the image magnification ratio "MR".

The distance calculating part 4 has a function of calculating the distance "a" to the subject 100 based on the first subject image and the second subject image imaged by the imaging part S. More specifically, the distance calculating part 4 has a function of calculating the distance "a" to the subject 100 based on the image magnification ratio "MR" between the magnification "$m_1$" of the first subject image and the magnification "$m_2$" of the second subject image. The distance calculating part 4 receives the image signal of the first subject image from the first image sensor S1 of the imaging part S and receives the image signal of the second subject image from the second image sensor S2 of the imaging part S.

After that, the distance calculating part 4 subjects a filtering process such as a Canny method to the image signal of the first subject image and the image signal of the second subject image to extract edge portions of the first subject image in the image signal of the first subject image and edge portions of the second subject image in the image signal of the second subject image. The distance calculating part 4 calculates a size (image width or image height) "$Y_{FD1}$" of the first subject image based on the extracted edge portions of the first subject image and calculates a size (image width or image height) "$Y_{FD2}$" of the second subject image based on the extracted edge portions of the second subject image.

A method for calculating the size "$Y_{FD1}$" of the first subject image and the size "$Y_{FD2}$" of the second subject image based on the edge portions of the first subject image and the edge portions of the second subject image extracted by the distance calculating part 4 is not particularly limited to a specific method. For example, it may be possible to consider a distance between an uppermost edge portion and a lowest edge portion among the edge portions of the subject image in the image signal as the image height of the subject image or consider a distance between a leftmost edge portion and a rightmost edge portion among the edge portions of the subject image in the image signal as the image width of the subject image.

After that, the distance calculating part 4 uses the above equation (14) of "MR"="$Y_{FD2}$"/"$Y_{FD1}$" to calculate the image magnification ratio "MR" between the magnification "$m_1$" of the first subject image and the magnification "$m_2$" of the second subject image based on the calculated size "$Y_{FD1}$" of the first subject image and the calculated size "$Y_{FD2}$" of the second subject image. After the image magnification ratio "MR" is calculated, the distance calculating part 4 refers to the association information stored in the association information storage part 3 to calculate (identify) the distance "a" to the subject 100 based on the calculated image magnification ratio "MR".

The three-dimensional image creating part 5 has a function of creating a three-dimensional image of the subject 100 based on the distance "a" to the subject 100 calculated by the distance calculating part 4 and the two-dimensional image of the subject 100 (that is the image signal of the first subject image or the image signal of the second subject image) obtained by the imaging part S. The words of "the three-dimensional image of the subject 100" mean data in which the calculated distance "a" to the subject 100 is associated with pixels of the color or monochrome two-dimensional image of the subject 100.

The display part 6 is a panel type display part such as a liquid crystal display part. The display part 6 displays various information containing the two-dimensional image of the subject 100 (the image signal of the first subject image or the image signal of the second subject image) obtained by the imaging part S, the distance "a" to the subject 100 calculated by the distance calculating part 4, images such as the three-dimensional image of the subject 100 created by the three-dimensional image creating part 5 and information required for operating the distance measuring camera 1 in the form of characters or images in accordance with the control from the processor of the control part 2.

The operation part 7 is used for performing operations by the user of the distance measuring camera 1. The operation part 7 is not particularly limited to a specific kind as long as the user of the distance measuring camera 1 can use the operation part 7 to perform the operations. For example, it is possible to employ a mouse, a keyboard, a numeric keypad, a button, a dial, a lever, a touch panel or the like as the operation part 7. The operation part 7 transmits signals respectively corresponding to the operations from the user of the distance measuring camera 1 to the processor of the control part 2.

The communication part 8 has a function of inputting data into the distance measuring camera 1 and/or outputting data from the distance measuring camera 1 to external devices. The communication part 8 may be configured to be connectable to a network such as the Internet. In this case, the distance measuring camera 1 can communicate with an external device such as an externally provided web server or data server by using the communication part 8.

As described above, in the distance measuring camera 1 of the present embodiment, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"), and thereby the change of the magnification "$m_1$" of the first subject image with respect to the distance "a" to the subject 100 and the change of the magnification "$m_2$" of the second subject image with respect to the distance "a" to the subject 100 are different from each other. Therefore, the distance measuring camera 1 of the present embodiment can uniquely calculate the distance "a" to the subject 100 based on the image magnification ratio "MR" ("$m_2$"/"$m_1$") of the magnification "$m_1$" of the first subject image and the magnification "$m_2$" of the second subject image.

Second Embodiment

Figure 5:
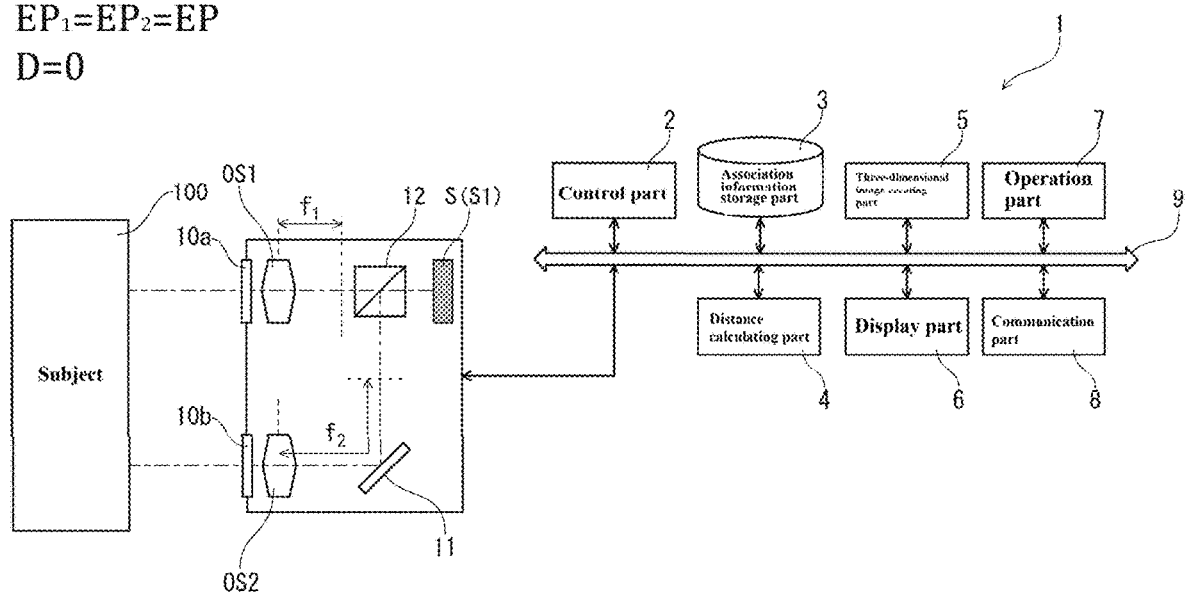
FIG. 5 is a block diagram schematically showing a distance measuring camera according to a second embodiment of the present invention.

Next, a distance measuring camera 1 according to a second embodiment of the present invention will be described in detail with reference to FIG. 5. FIG. 5 is a block diagram schematically showing the distance measuring camera according to the second embodiment of the present invention.

Hereinafter, the distance measuring camera 1 of the second embodiment will be described by placing emphasis on the points differing from the distance measuring camera 1 of the first embodiment with the same matters being omitted from the description. The distance measuring camera 1 of the second embodiment has the same configuration as that of the distance measuring camera 1 of the first embodiment except that the imaging part S is constituted of only the first image sensor S1, the first optical system OS1 and the second optical system OS2 are provided in one housing, and a first shutter 10*a*, a second shutter 10*b*, a mirror 11 and a prism 12 are provided in the one housing.

As shown in FIG. 5, in the present embodiment, the first optical system OS1 and the second optical system OS2 are arranged in the one housing. Further, the first shutter 10*a* for blocking incidence of the light from the subject 100 to the first optical system OS1 is arranged on the front side of the first optical system OS1 (on the subject side) and the second shutter 10*b* for blocking incidence of the light from the subject 100 to the second optical system OS2 is arranged on the front side of the second optical system OS2.

The first shutter 10*a* and the second shutter 10*b* are controlled by the processor of the control part 2 and opened and closed in accordance with the signal from the processor of the control part 2. The first shutter 10*a* and the second shutter 10*b* are controlled so that only one of them is opened. Thus, both of the first shutter 10*a* and the second shutter 10*b* are not opened at the same time.

Further, the mirror 11 and the prism 12 are arranged on an optical path of the light collected by the second optical system OS2. The light passing through the second shutter 10*b* and collected by the second optical system OS2 passes through the mirror 11 and the prism 12 and reaches the imaging surface of the first image sensor S1. Thus, the second subject image is formed on the imaging surface of the first image sensor S1. As shown in the drawing, in the present embodiment, the optical axis of the first optical system OS1 and the optical axis of the second optical system OS2 coincide with each other in a section from the prism 12 to the first image sensor S1. However, in other sections, for example, in a section from the subject 100 to the first optical system OS1 or the second optical system OS2, the optical axis of the first optical system OS1 and the optical axis of the second optical system OS2 do not coincide with each other.

When the first shutter 10*a* is opened, the light from the subject 100 enters to the first optical system OS1 and thus the first subject image is formed on the imaging surface of the image sensor S1. At this time, the first image sensor S1 obtains the image signal of the first subject image and transmits the image signal of the first subject image to the control part 2 and the distance calculating part 4.

On the other hand, when the second shutter 10*b* is opened, the light from the subject 100 enters to the second optical system OS2 and pass through the mirror 11 and the prism 12, and the second subject image is formed on the imaging surface of the first image sensor S1. At this time, the first image sensor S1 obtains the image signal of the second subject image and transmits the image signal of the second subject image to the control part 2 and the distance calculating part 4.

Thus, in the present embodiment, either one of the first shutter 10*a* and the second shutter 10*b* is opened due to the control from the processor of the control part 2. With this control, the distance measuring camera 1 can separately obtain the image signal of the first subject image and the image signal of the second subject image.

According to this embodiment, it is also possible to provide the same effects as those of the above-described first embodiment. Further, in this embodiment, it is possible to configure the imaging part S with the single image sensor (the first image sensor S1) which can image both of the first subject image formed by the first optical system OS1 and the second subject image formed by the second optical system OS2. Thus, it is possible to reduce the size and the cost of the distance measuring camera 1.

Third Embodiment

Figure 6:
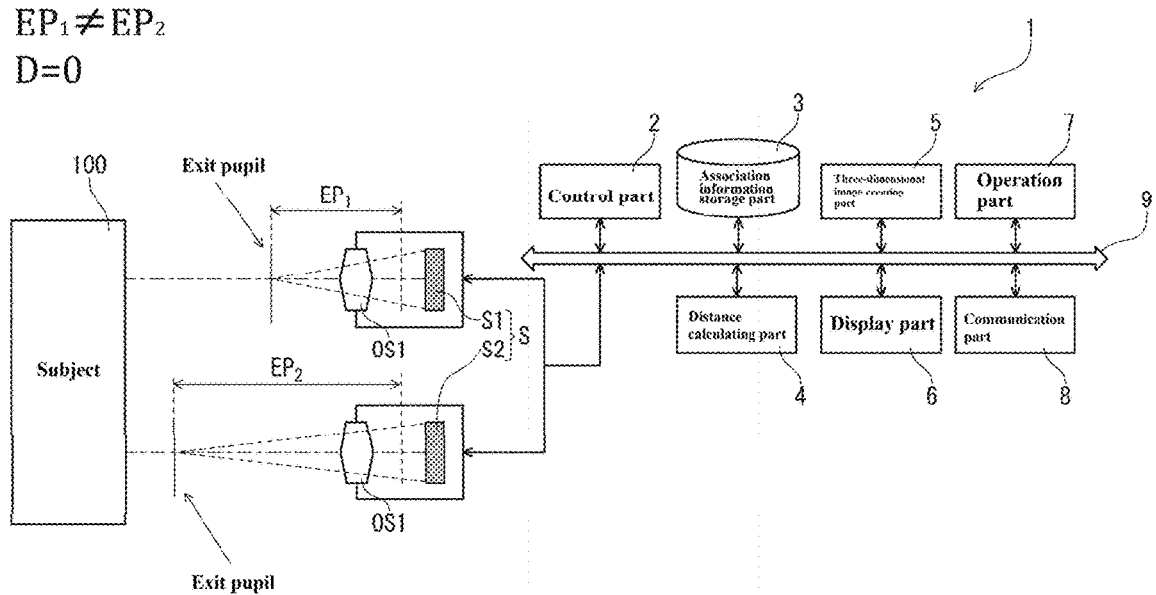
FIG. 6 is a block diagram schematically showing a distance measuring camera according to a third embodiment of the present invention.

Next, a distance measuring camera 1 according to a third embodiment of the present invention will be described in detail with reference to FIG. 6. FIG. 6 is a block diagram schematically showing the distance measuring camera according to the third embodiment of the present invention.

Hereinafter, the distance measuring camera 1 of the third embodiment will be described by by placing emphasis on the points differing from the distance measuring camera 1 of the first embodiment with the same matters being omitted from the description. The distance measuring camera 1 of the present embodiment has the same configuration as that of the distance measuring camera 1 of the first embodiment except that the configurations of the first optical system OS1 and the second optical system OS2 are modified.

The distance measuring camera 1 of the present embodiment is characterized in that the first optical system OS1 and the second optical system OS2 are configured so as to satisfy the second condition that the distance "$EP_1$" from the exit pupil of the first optical system OS1 to the image formation position of the first subject image when the subject 100 is located at the infinity point and the distance "$EP_2$" from the exit pupil of the second optical system OS2 to the image formation position of the second subject image when the subject 100 is located at the infinity point are different from each other ("$EP_1$"≠"$EP_2$") among the above-described three conditions required to calculate the distance "a" to the subject 100 based on the image magnification ratio "MR". On the other hand, in the present embodiment, the first optical system OS1 and the second optical system OS2 are configured and arranged so as not to satisfy the two other conditions ("$f_1$"≠"$f_2$" and "D"≠0) among the above three conditions. Further, the distance measuring camera 1 of the present embodiment is configured to satisfy the fourth condition that the image magnification ratio "MR" is established as the function of the distance "a".

Therefore, the general formula (13) for calculating the distance "a" to the subject 100 based on the image magnification ratio "MR" is simplified by the conditions of "$f_1$"="$f_2$"="f" and "D"=0, and can be expressed by the following equation (17).

[Equation 17]

$$a = \frac{K \cdot (f^2 - EP_1 \cdot f) - MR \cdot (f^2 - EP_2 \cdot f)}{MR \cdot EP_2 - K \cdot EP_1} \quad (17)$$

Here, the coefficient "K" is expressed by the following equation (18).

[Equation 18]

$$K = \frac{a_{FD1} - f}{a_{FD2} - f} \cdot \frac{f^2 - EP_2 \cdot f + EP_2 \cdot a_{FD2}}{f^2 - EP_1 \cdot f + EP_1 \cdot a_{FD1}} \quad (18)$$

As described above, in the distance measuring camera 1 of the present embodiment, the first optical system OS1 and the second optical system OS2 are configured so that the distance "$EP_1$" from the exit pupil of the first optical system OS1 to the image formation position of the first subject image when the subject 100 is located at the infinity point and the distance "$EP_2$" from the exit pupil of the second optical system OS2 to the image formation position of the second subject image when the subject 100 is located at the infinity point are different from each other ("$EP_1$"≠"$EP_2$"), and thereby the change of the magnification "$m_1$" of the first subject image with respect to the distance "a" to the subject 100 and the change of the magnification "$m_2$" of the second subject image with respect to the distance "a" to the subject 100 are different from each other. Therefore, the distance measuring camera 1 of the present embodiment can uniquely calculate the distance "a" to the subject 100 based on the image magnification ratio "MR" ("$m_2$"/"$m_1$") of the magnification "$m_1$" of the first subject image and the magnification "$m_2$" of the second subject image.

According to this embodiment, it is also possible to provide the same effects as those of the above-described first embodiment. In this regard, the configurations and the arrangements of the first optical system OS1 and the second optical system OS2 in the present embodiment may be any aspect as long as the above-mentioned second condition ("$EP_1$"≠"$EP_2$") is satisfied, and thereby the change of the magnification "$m_1$" of the first subject image with respect to the distance "a" to the subject 100 and the change of the magnification "$m_2$" of the second subject image with respect to the distance "a" to the subject 100 are different from each other.

Fourth Embodiment

Figure 7:
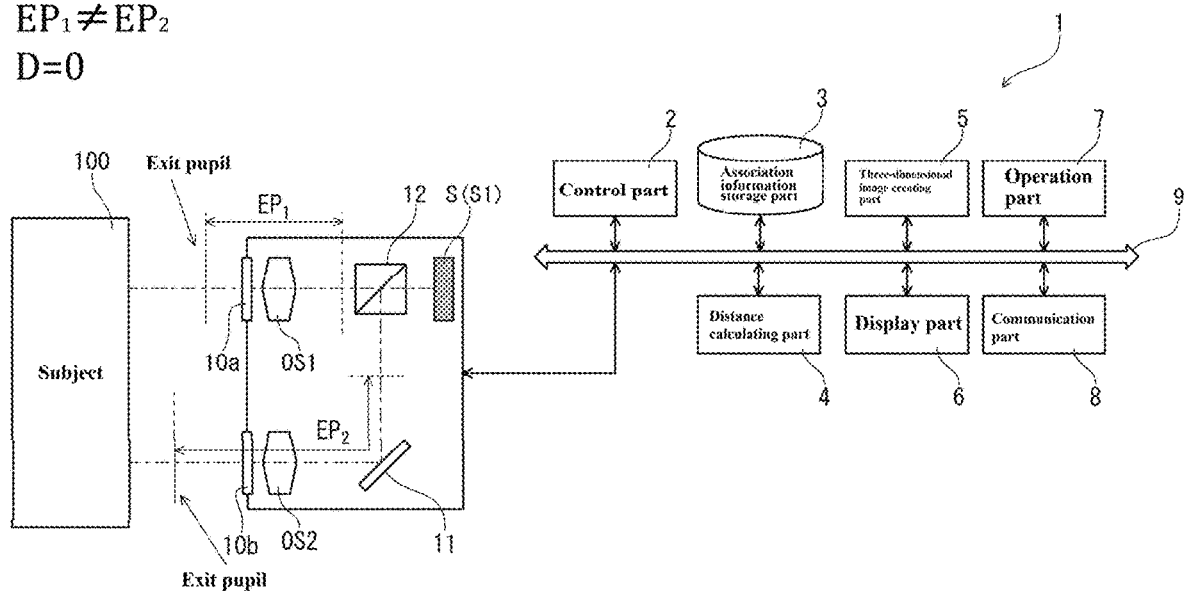
FIG. 7 is a block diagram schematically showing a distance measuring camera according to a fourth embodiment of the present invention.

Next, a distance measuring camera 1 according to a fourth embodiment of the present invention will be described in detail with reference to FIG. 7. FIG. 7 is a block diagram schematically showing the distance measuring camera according to the fourth embodiment of the present invention.

Hereinafter, the distance measuring camera 1 of the fourth embodiment will be described by placing emphasis on the points differing from the distance measuring camera 1 of the third embodiment with the same matters being omitted from the description. Differences between the distance measuring camera 1 of the present embodiment and the distance measuring camera 1 of the third embodiment are the same as the differences between the distance measuring camera 1 of the first embodiment and the distance measuring camera 1 of the second embodiment described above. Namely, the distance measuring camera 1 of the fourth embodiment has the same configuration as that of the distance measuring camera 1 of the third embodiment except that the imaging part S is constituted of only the first image sensor S1, the first optical system OS1 and the second optical system OS2 are provided in one housing, the first shutter 10a, the second shutter 10b, the mirror 11 and the prism 12 are provided in the one housing.

Similar to the distance measuring camera 1 of the second embodiment, in the distance measuring camera 1 of the present embodiment, the first optical system OS1 and the second optical system OS2 are arranged in the one housing. Further, the first shutter 10a for blocking the incidence of the light from the subject 100 to the first optical system OS1 is arranged on the front side of the first optical system OS1 (on the subject side) and the second shutter 10b for blocking the incidence of the light from the subject 100 to the second optical system OS2 is arranged on the front side of the second optical system OS2.

Since the first shutter 10a and the second shutter 10b perform the same operation as that of the second embodiment described above, the distance measuring camera 1 can use only a single image sensor (the first image sensor S1) to separately obtain the image signal of the first subject image and the image signal of the second subject image.

According to this embodiment, it is also possible to provide the same effects as those of the above-described third embodiment. In addition, similarly to the second embodiment described above, in the present embodiment, the imaging part S can be constituted of the single image sensor (the first image sensor S1) which can image both of the first subject image formed by the first optical system OS1 and the second subject image formed by the second optical system OS2. Thus, it is possible to reduce the size and the cost of the distance measuring camera 1.

Fifth Embodiment

Figure 8:
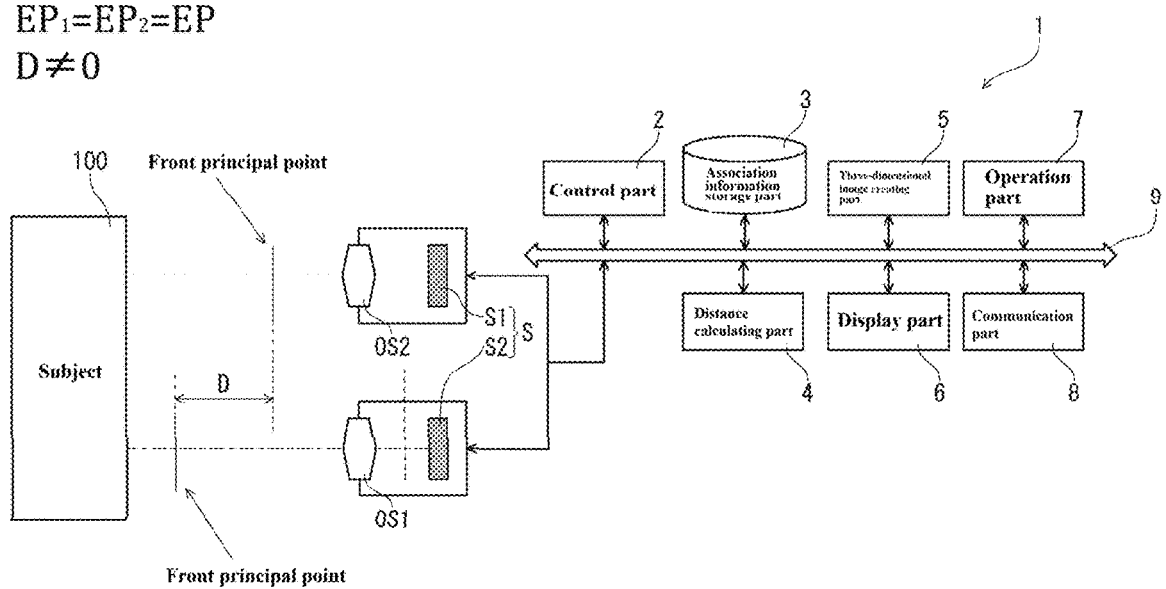
FIG. 8 is a block diagram schematically showing a distance measuring camera according to a fifth embodiment of the present invention.

Next, a distance measuring camera 1 according to a fifth embodiment of the present invention will be described in detail with reference to FIG. 8. FIG. 8 is a block diagram schematically showing the distance measuring camera according to the fifth embodiment of the present invention.

Hereinafter, the distance measuring camera 1 of the fifth embodiment will be described by placing emphasis on the points differing from the distance measuring camera 1 of the first embodiment with the same matters being omitted from the description. The distance measuring camera 1 of the fifth embodiment has the same configuration as that of the distance measuring camera 1 of the first embodiment except that the configurations and the arrangements of the first optical system OS1 and the second optical system OS2 are modified.

The distance measuring camera 1 of the present embodiment is characterized in that the first optical system OS1 and the second optical system OS2 are configured and arranged so as to satisfy the third condition that the difference "D" in the depth direction (the optical axis direction) exists between the front principal point of the first optical system OS1 and the front principal point of the second optical system OS2 among the above-mentioned three conditions required to calculate the distance "a" to the subject 100 based on the image magnification ratio "MR". On the other hand, in the present embodiment, the first optical system OS1 and the second optical system OS2 are configured so as not to satisfy the two other conditions ("$f_1$"≠"$f_2$" and "$EP_1$"≠"$EP_2$") among the above-mentioned three conditions. Further, the distance measuring camera 1 of the present embodiment is configured to satisfy the fourth condition that the image magnification ratio "MR" is established as the function of the distance "a".

Therefore, the general equation (13) for calculating the distance "a" to the subject 100 based on the image magnification "MR" is simplified by the conditions of "$f_1$"="$f_2$"="f" and "$EP_1$"="$EP_2$"="EP", and can be expressed by the following equation (19).

[Equation 19]
$$a = \frac{K \cdot (f^2 - EP \cdot f) - MR \cdot (f^2 - EP \cdot f + EP \cdot D)}{EP \cdot (MR - K)} \quad (19)$$

Here, the coefficient K is expressed by the following equation (20).

[Equation 20]
$$K = \frac{a_{FD1} - f}{a_{FD2} - f} \cdot \frac{f^2 - EP \cdot f + EP \cdot a_{FD2}}{f^2 - EP \cdot f + EP \cdot a_{FD1}} \quad (20)$$

As described above, the distance measuring camera 1 of the present embodiment, the first optical system OS1 and the second optical system OS2 are configured and arranged so that the difference "D" in the depth direction (the optical axis direction) exists between the front principal point of the first optical system OS1 and the front principal point of the second optical system OS2 ("D"≠0), and thereby the change of the magnification "$m_1$" of the first subject image with respect to the distance "a" to the subject 100 and the change of the magnification "$m_2$" of the second subject image with respect to the distance "a" to the subject 100 are different from each other. Therefore, the distance measuring camera 1 of the present embodiment can uniquely calculate the distance "a" to the subject 100 based on the image magnification ratio "MR" ("$m_2$"/"$m_1$") of the magnification "$m_1$" of the first subject image and the magnification "$m_2$" of the second subject image.

According to this embodiment, it is also possible to provide the same effects as those of the above-described first embodiment. In this regard, the configurations and arrangements of the first optical system OS1 and the second optical system OS2 in the present embodiment may be any aspect as long as the above-mentioned third condition ("D"≠0) is satisfied, and thereby the change of the magnification "$m_1$" of the first subject image with respect to the distance "a" to the subject 100 and the change of the magnification "$m_2$" of the second subject image with respect to the distance "a" to the subject 100 are different from each other.

Sixth Embodiment

Figure 9:
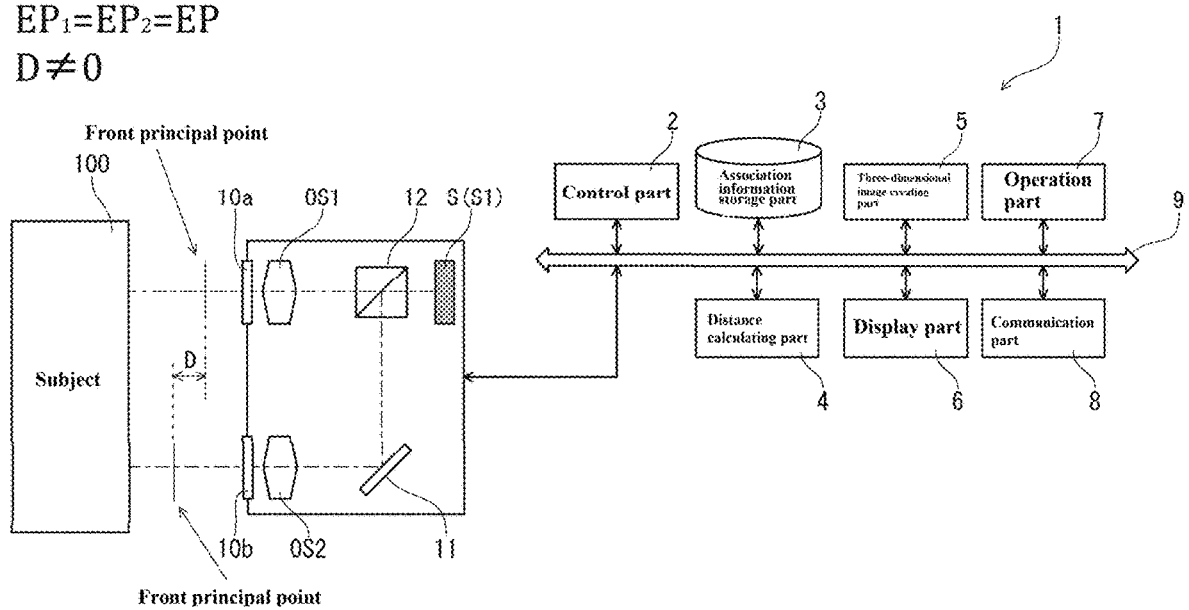
FIG. 9 is a block diagram schematically showing a distance measuring camera according to a sixth embodiment of the present invention.

Next, a distance measuring camera 1 according to a sixth embodiment of the present invention will be described in detail with reference to FIG. 9. FIG. 9 is a block diagram schematically showing the distance measuring camera according to the sixth embodiment of the present invention.

Hereinafter, the distance measuring camera 1 of the sixth embodiment will be described by placing emphasis on the points differing from the distance measuring camera 1 of the fifth embodiment with the same matters being omitted from the description. Differences between the distance measuring camera 1 of the present embodiment and the distance measuring camera 1 of the fifth embodiment are the same as the differences between the distance measuring camera 1 of the second embodiment and the distance measuring camera 1 of the first embodiment and the differences between the distance measuring camera 1 of the fourth embodiment and the distance measuring camera 1 of the third embodiment. Namely, the distance measuring camera 1 of the sixth embodiment has the same configuration as that of the distance measuring camera 1 of the fifth embodiment except that the imaging part S is constituted of only the first image sensor S1, the first optical system OS1 and the second optical system OS2 are provided in one housing, the first shutter 10a, the second shutter 10b, the mirror 11 and the prism 12 are provided in the one housing.

In the present embodiment, as shown in the drawing, the first optical system OS1 and the second optical system OS2 are arranged on the same straight line in a direction perpendicular to the depth direction (the optical axis direction) in the one housing. On the other hand, the first optical system OS1 and the second optical system OS2 are configured so that a distance from the first optical system OS1 to the front principal point of the first optical system OS1 and a distance from the second optical system OS2 to the front principal point of the second optical system OS2 are different from each other and thus the difference "D" in the depth direction (the optical axis direction) exists between the front principal point of the first optical system OS1 and the front principal point of the second optical system OS2 ("D"≠0).

Similar to the distance measuring cameras 1 of the second embodiment and the fourth embodiment, in the distance measuring camera 1 of the present embodiment, the first optical system OS1 and the second optical system OS2 are arranged in the one housing. Further, the first shutter 10a for blocking the incidence of the light from the subject 100 to the first optical system OS1 is arranged on the front side of the first optical system OS1 (on the subject side) and the second shutter 10b for blocking the incidence of the light from the subject 100 to the second optical system OS2 is arranged on the front side of the second optical system OS2.

Since the first shutter 10a and the second shutter 10b perform the same operation as the second embodiment and the fourth embodiment described above, the distance measuring camera 1 can use only a single image sensor (the first image sensor S1) to separately obtain the image signal of the first subject image and the image signal of the second subject image.

According to this embodiment, it is also possible to provide the same effects as the above-described fifth embodiment. In addition, similarly to the second embodiment described above, in the present embodiment, the imaging part S can be configured by the single image sensor (the first image sensor S1) which can image both of the first subject image formed by the first optical system OS1 and the second subject image formed by the second optical system OS2. Thus, it is possible to reduce the size and the cost of the distance measuring camera 1.

Seventh Embodiment

Figure 10:
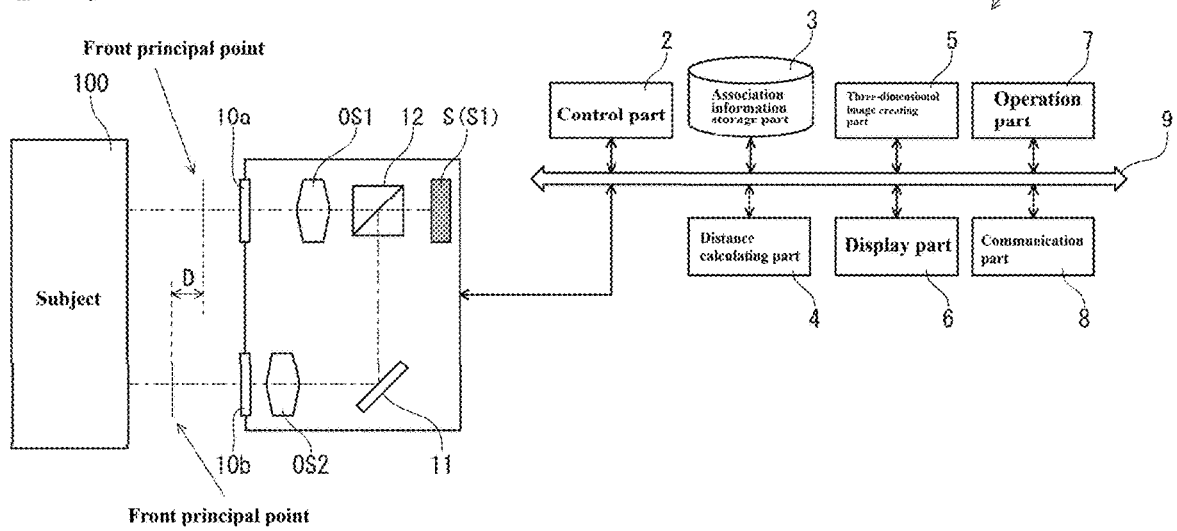
FIG. 10 is a block diagram schematically showing a distance measuring camera according to a seventh embodiment of the present invention.

Next, a distance measuring camera 1 according to a seventh embodiment of the present invention will be described in detail with reference to FIG. 10. FIG. 10 is a block diagram schematically showing the distance measuring camera according to the seventh embodiment of the present invention.

Hereinafter, the distance measuring camera 1 of the seventh embodiment will be described focusing on the difference from the distance measuring camera 1 of the sixth embodiment with the same matters being omitted from the description. The distance measuring camera 1 of the seventh embodiment has the same configuration as that of the distance measuring camera 1 of the first embodiment except that the configuration and arrangements of the first optical system OS1 and the second optical system OS2 are modified.

As shown in FIG. 10, in the present embodiment, the first optical system OS1 and the second optical system OS2 are arranged in the one housing so that a difference in the depth direction exists between the positions of the first optical system OS1 and the second optical system OS2. Therefore, even if the first optical system OS1 and the second optical system OS2 are configured so that the distance from the first optical system OS1 to the front principal point of the first optical system OS1 and the distance from the second optical system OS2 to the front principal point of the second optical system OS2 are equal to each other, it is possible to ensure the distance "D" in the depth direction (the optical axis direction) between the front principal point of the first optical system OS1 and the front principal point of the second optical system OS2 ("D"≠0). According to this embodiment, it is also possible to provide the same effects as the above-described sixth embodiment.

As described above in detail referring to each embodiment, the distance measuring camera 1 of the present invention can uniquely calculate the distance "a" to the subject 100 based on the image magnification ratio "MR" ("$m_2$"/"$m_1$") between the magnification "$m_1$" of the first subject image and the magnification "$m_2$" of the second subject image without using any disparity between a plurality of images and without irradiating any constant pattern onto the subject.

Therefore, since the distance measuring camera 1 of the present invention does not need to ensure a large disparity unlike the conventional stereo camera type distance measuring camera using a disparity between a plurality of images, it is possible to accurately calculate the distance "a" to the subject 100 even if the first optical system OS1 and the second optical system OS2 are arranged so as to be close to each other. Thus, it is possible to reduce the size of the distance measuring camera 1 as compared with the conventional stereo camera type distance measuring camera. Further, since the distance measuring camera 1 of the present invention does not use any disparity to calculate the distance "a" to the subject 100, it is possible to accurately calculate the distance "a" to the subject 100 even if the subject 100 is located at a position closed to the distance measuring camera 1. Further, according to the present invention, it becomes unnecessary to design the distance measuring camera 1 with considering the disparities. Thus, it is possible to enhance the flexibility of design for the distance measuring camera.

Further, in the distance measuring camera 1 of the present invention, it is not necessary to use a special light source such as a projector for projecting constant pattern light onto the subject unlike the conventional pattern projection type distance measuring camera. Thus, it is possible to simplify the system configuration of the distance measuring camera 1. As a result, it is possible to realize downsizing, power-saving and cost-reducing of the distance measuring camera 1 compared with the conventional pattern projection type distance measuring camera.

Further, as described above, in the distance measuring camera 1 of the present invention, the above-mentioned general expression (13) used for calculating the distance "a" to the subject 100 based on the image magnification ratio "MR" can be used for calculating the distance "a" to the subject 100 even if each of the first optical system OS1 and the second optical system OS2 is a fixed focus system which does not have an autofocus function and even when defocus exists, that is the case that the imaging surface of the first image sensor S1 is not located at the image formation position of the first subject image and the imaging surface of the second image sensor S2 is not located at the image formation position of the second subject image.

Therefore, the distance measuring camera 1 of the present invention does not need to use a lens actuator system for providing the auto-focus function for the first optical system OS1 and the second optical system OS2. Therefore, it is possible to reduce the number of parts of the distance measuring camera 1 and thus it is possible to reduce the size, the weight and the cost of the distance measuring camera 1. Further, since it is not necessary to actuate the first optical system OS1 and the second optical system OS2 by consuming power, it is possible to reduce the consumed power of the distance measuring camera 1. Further, since the processing time required for the focus operation is also unnecessary, it is also possible to shorten the measurement time required to calculate the distance "a" to the subject 100.

Further, although the two optical systems (the first optical system OS1 and the second optical system OS2) are used in the above embodiments, the number of the optical systems used in the present invention is not limited thereto. For example, an aspect further comprising an additional optical system in addition to the first optical system OS1 and the second optical system OS2 is also involved within the scope of the present disclosure. In this case, the additional optical system is configured and arranged so that a change of a magnification of a subject image formed by the additional optical system with respect to the distance "a" to the subject 100 is different from the change of the magnification "$m_1$" of the first subject image with respect to the distance "a" to the subject 100 and the change of the magnification "$m_2$" of the second subject image with respect to the distance "a" to the subject 100.

In this regard, although the first optical system OS1 and the second optical system OS2 are configured and arranged so as to satisfy one of the above-mentioned three conditions required to calculate the distance "a" to the subject 100 based on the image magnification ratio "MR" in each embodiment described above, the present invention is not limited thereto as long as the first optical system OS1 and the second optical system OS2 are configured and arranged so as to satisfy at least one of the above-mentioned three conditions. For example, an aspect in which the first optical system OS1 and the second optical system OS2 are configured and arranged so as to satisfy all or any combinations of the above-mentioned three conditions is also involved within the scope of the present invention.

<Distance Measuring Method>

Figure 11:
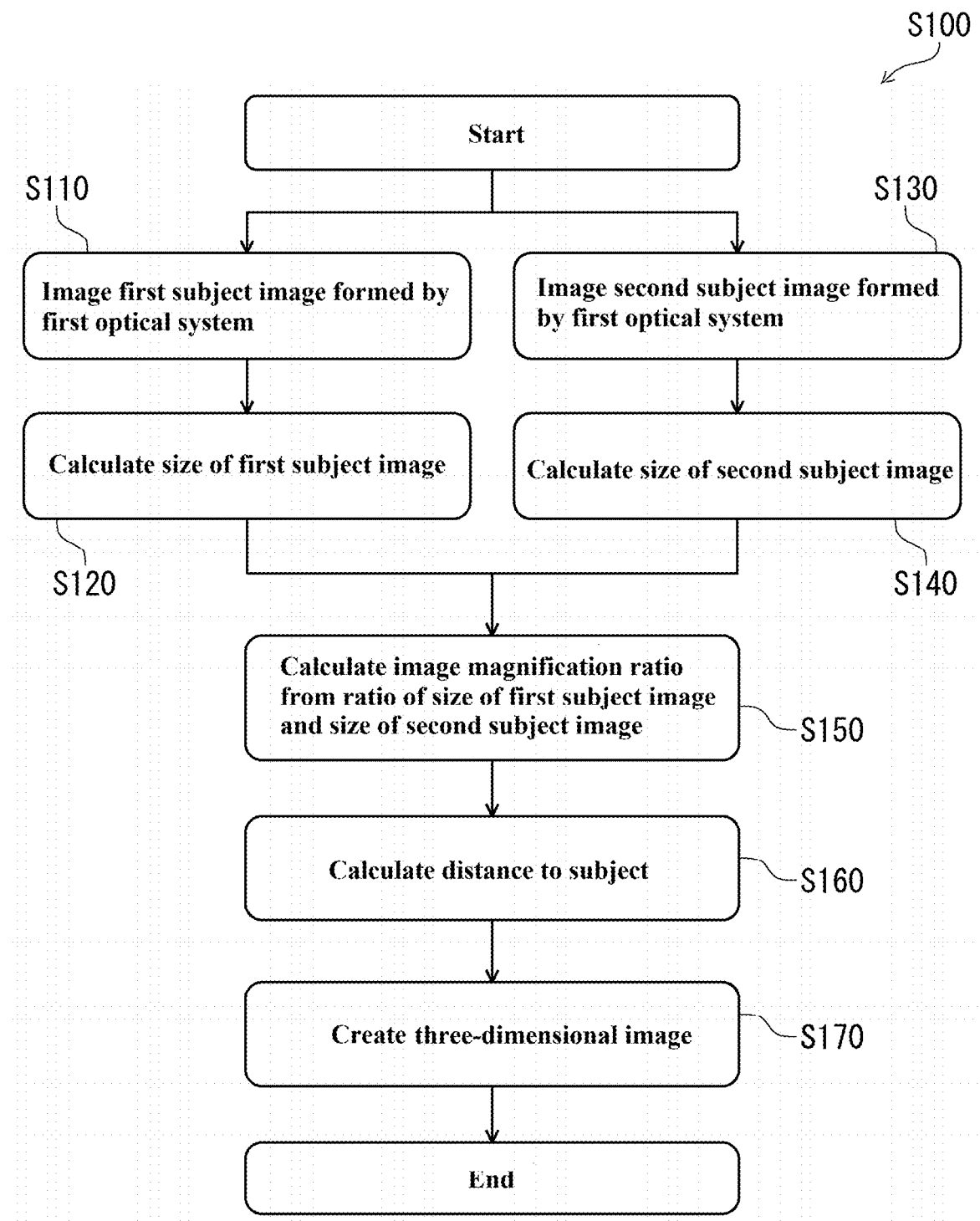
FIG. 11 is a flowchart for explaining a distance measuring method performed by the distance measuring camera of the present invention.

Next, a distance measuring method performed by the distance measuring camera 1 of the present invention will be described with reference to FIG. 11. FIG. 11 is a flowchart for explaining the distance measuring method performed by the distance measuring camera of the present invention. Although the distance measuring method described in detail below can be performed by using the distance measuring cameras 1 according to the first to seventh embodiments of the present invention and an arbitrary apparatus having the same function as that of the distance measuring camera 1 described above, for the sake of explanation, it is assumed that the distance measuring method is performed by using the distance measuring camera 1 according to the first embodiment.

A distance measuring method S100 shown in FIG. 11 is started when the user of the distance measuring camera 1 uses the operation part 7 to perform an operation for measuring the distance "a" to the subject 100. At a step S110, the first image sensor S1 of the imaging part S images the first subject image formed by the first optical system OS1 to obtain the image signal of the first subject image. The image signal of the first subject image is transmitted to the control part 2 and the distance calculating part 4 through the data bus 9. At a step S120, the distance calculating part 4 calculates the size (image height or image width) "$Y_{FD1}$" of the first subject image from the received image signals of the first subject image.

On the other hand, at a step S130, the second image sensor S2 of the imaging part S images the second subject image formed by the second optical system OS2 to obtain the image signal of the second subject image. The image signal of the second subject image is transmitted to the control part 2 and the distance calculating part 4 through the data bus 9. At a step S140, the distance calculating part 4 calculates the size (image height or image width) "$Y_{FD2}$" of the second subject image from the received image signals of the second subject image.

In this regard, to obtain the image signal of the first subject image at the step S110 and to calculate the size "$Y_{FD1}$" of the first subject image at the step S120 may be performed simultaneously with to obtain the image signal of the second subject image at the step S130 and to calculate the size "$Y_{FD2}$" of the second subject image at the step S140, or may be performed separately from them.

When both the size "$Y_{FD1}$" of the first subject image and the size "$Y_{FD2}$" of the second subject image are calculated, the process proceeds to a step S150. At the step S150, the distance calculating part 4 calculates the image magnification ratio "MR" of the magnification "$m_1$" of the first subject image and the magnification "$m_2$" of the second subject image based on the size "$Y_{FD1}$" of the first subject image and the size "$Y_{FD2}$" of the second subject image according to the above equation (14) "MR"="$Y_{FD2}$"/"$Y_{FD1}$".

Next, at a step S160, the distance calculating part 4 refers to the associated information stored in the associated information storage part 3 and calculates (identify) the distance "a" to the subject 100 based on the calculated image magnification ratio "MR". When the distance "a" to the subject 100 is calculated at the step S160, the process proceeds to a step S170.

At the step S170, the three-dimensional image generating part 5 creates the three-dimensional image of the subject 100 based on the distance "a" to the subject 100 calculated by the distance calculating part 4 and the two-dimensional image of the subject 100 (the image signal of the first subject image or the image signal of the second subject image) obtained by the imaging part S. After that, the two-dimensional image of the subject 100, the distance "a" to the subject 100 and/or the three-dimensional image of the subject 100 obtained in the previous steps are displayed on the display part 6 or transmitted to an external device by the communication part 8. Next, the distance measuring method S100 ends.

Although the distance measuring camera of the present invention has been described based on the embodiments shown in the drawings, the present invention is not limited thereto. Each configuration of the present invention can be replaced with any configuration capable of performing the same function or any configuration can be added to each configuration of the present invention.

A person having skill in the art and the field to which the present invention belongs would be able to carry out modifications of the described configuration of the distance measuring camera of the present invention without meaningfully departing from the principles, ideas and scope of the present invention. Further, distance measuring cameras having modified configurations are also involved within the scope of the present invention. For example, an aspect in which the distance measuring cameras of the first to seventh embodiments are arbitrarily combined is also involved within the scope of the present invention.

In addition, the number and types of components of the distance measuring camera shown in FIGS. 4 to 10 are merely illustrative examples, and the present invention is not necessarily limited thereto. An aspect in which any component is added or combined or any component is omitted without departing from the principle and intent of the present invention is also involved within the scope of the present invention. Further, each component of the distance measuring camera may be practiced by hardware, software or a combination thereof.

In addition, the number and types of the steps of the distance measuring method S100 shown in FIG. 11 are merely illustrative examples and the present invention is not necessarily limited to thereto. Further, an aspect that any steps have been added or combined for any purpose or any steps have been omitted without departing from the principle and intent of the present invention is also involved within the scope of the present invention.

<Examples of Application>

An example of application of the distance measuring camera 1 of the present invention is not particularly limited. For example, the distance measuring camera 1 can be used for imaging a portrait of the subject and obtaining the three-dimensional image of the face of the subject. In such an application, it is preferable to incorporate the distance measuring camera 1 of the present invention into a mobile device such as a smart phone or a mobile phone.

Further, the distance measuring camera 1 of the present invention can be applied for a handler robot used for assembling and inspecting a precision device. According to the distance measuring camera 1, since it is possible to measure a distance from an arm or an main body of the handler robot to the precision device or parts thereof when assembling the precision device, it becomes possible to allow a gripping portion of the handler robot to accurately grip the parts.

Further, since the distance measuring camera 1 of the present invention can measure the distance to the subject, it is possible to obtain three-dimensional information of the subject. Such three-dimensional information of the subject can be used for forming a three-dimensional structure due to a 3D printer.

Further, by utilizing the distance measuring camera 1 of the present invention for a vehicle, it is possible to measure the distance from the vehicle to any object such as a pedestrian or an obstacle. Information on the calculated distance to any subject can be used for automatic braking systems and automatic driving of the vehicle.

INDUSTRIAL APPLICABILITY

The distance measuring camera of the present invention uses the two optical systems configured so that the changes of the magnifications of the subject images according to the distance to the subject are different from each other and can measure the distance to the subject based on the image magnification ratio (the ratio of the magnifications) between the two subject images respectively formed by the two optical systems. Thus, in the distance measuring camera of the present invention, it is not necessary to ensure a large disparity unlike the conventional stereo camera type distance measuring camera using disparities among a plurality of images. Therefore, even if the two optical systems are arranged so as to be close to each other, it is possible to accurately calculate the distance to the subject. As a result, it is possible to reduce a size of the distance measuring camera compared with the conventional stereo camera type distance measuring camera. Further, since the distance measuring camera of the present invention does not use any disparity to calculate the distance to the subject, it is possible to accurately calculate the distance to the subject even if the subject is located at a position closed to the distance measuring camera. Further, according to the present invention, it becomes unnecessary to design the distance measuring camera with considering the disparities. Thus, it is possible to enhance the flexibility of design for the distance measuring camera.

Further, in the distance measuring camera of the present invention, it is not necessary to use a special light source such as a projector for projecting constant pattern light onto the subject unlike the conventional pattern projection type distance measuring camera. Thus, it is possible to simplify a system configuration of the distance measuring camera. As a result, it is possible to realize downsizing, power-serving and cost-reducing of the distance measuring camera compared with the conventional pattern projection type distance measuring camera. Thus, the present invention has industrial applicability.

The invention claimed is:
1. A distance measurement camera, comprising:
   a first optical system for collecting light from a subject to form a first subject image;
   a second optical system for collecting the light from the subject to form a second subject image;
   an imaging part for imaging the first subject image formed by the first optical system and the second subject image formed by the second optical system; and
   a distance calculating part for calculating a distance to the subject based on the first subject image and the second subject image imaged by the imaging part,
   wherein the distance calculating part calculates the distance to the subject by using at least:
      an image magnification ratio between a magnification of the first subject image and a magnification of the second subject image,
      a focal length of the first optical system,
      a focal length of the second optical system,
      a distance from an exit pupil of the first optical system to an image formation position of the first subject image when the subject is located at an infinity position,
      a distance from an exit pupil of the second optical system to an image formation position of the second subject image when the subject is located at the infinity position,
      a distance from a front principle point of the first optical system to the subject when the first subject image is in best focus on an imaging surface of the imaging part, and
      a distance from a front principle point of the second optical system to the subject when the second subject image is in the best focus on the imaging surface of the imaging part.

2. The distance measuring camera as claimed in claim 1, wherein the first optical system and the second optical system are configured so that the focal length of the first optical system and the focal length of the second optical system are different from each other, and thereby a change of the magnification of the first subject image according to the distance to the subject is different from a change of the magnification of the second subject image according to the distance to the subject.

3. The distance measuring camera as claimed in claim 1, wherein the first optical system and the second optical system are configured so that the distance from the exit pupil of the first optical system to the image formation position of the first subject image formed by the first optical system when the subject is located at the infinity point is different from the distance from the exit pupil of the second optical system to the image formation position of the second subject image formed by the second optical system when the subject is located at the infinity point, and thereby a change of the magnification of the first subject image according to the distance to the subject is different from a change of the magnification of the second subject image according to the distance to the subject.

4. The distance measuring camera as claimed in claim 1, wherein a difference in a depth direction exists between the front principal point of the first optical system and the front principal point of the second optical system, and thereby a change of the magnification of the first subject image according to the distance to the subject is different from a change of the magnification of the second subject image according to the distance to the subject.

5. The distance measuring camera as claimed in claim 1, further comprising an association information storage part storing association information for associating the image magnification ratio between the magnification of the first subject image and the magnification of the second subject image with the distance to the subject, wherein the distance calculating part calculates the distance to the subject based on the image magnification ratio between the magnification of the first subject image and the magnification of the second subject image and the association information in the association information storage part.

6. The distance measuring camera as claimed in claim 1, wherein the distance calculating part calculates a ratio between a size of the first subject image and a size of the second subject image as the image magnification ratio between the magnification of the first subject image and the magnification of the second subject image.

7. The distance measuring camera as claimed claim 1, wherein the imaging part contains a first image sensor for imaging the first subject image and a second image sensor for imaging the second subject image.

8. The distance measuring camera as claimed in claim 1, wherein the imaging part is a single image sensor for imaging both of the first subject image and the second subject image.

9. The distance measuring camera as claimed in claim 1, wherein the distance calculating part calculates the distance to the subject by further using a difference in a depth direction exists between the front principal point of the first optical system and the front principal point of the second optical system.

10. A distance measurement camera, comprising:
a first optical system for collecting light from a subject to form a first subject image;
a second optical system for collecting the light from the subject to form a second subject image;
an imaging part for imaging the first subject image formed by the first optical system and the second subject image formed by the second optical system; and
a distance calculating part for calculating a distance to the subject based on the first subject image and the second subject image imaged by the imaging part,
wherein the distance calculating part calculates the distance to the subject based on an image magnification ratio between a magnification of the first subject image and a magnification of the second subject image, and
wherein the first optical system and the second optical system are configured so that a distance from an exit pupil of the first optical system to an image formation position of the first subject image formed by the first optical system when the subject is located at an infinity point is different from a distance from an exit pupil of the second optical system to an image formation position of the second subject image formed by the second optical system when the subject is located at the infinity point, and thereby a change of the magnification of the first subject image according to the distance to the subject is different from a change of the magnification of the second subject image according to the distance to the subject.

* * * * *